Patented Mar. 16, 1937

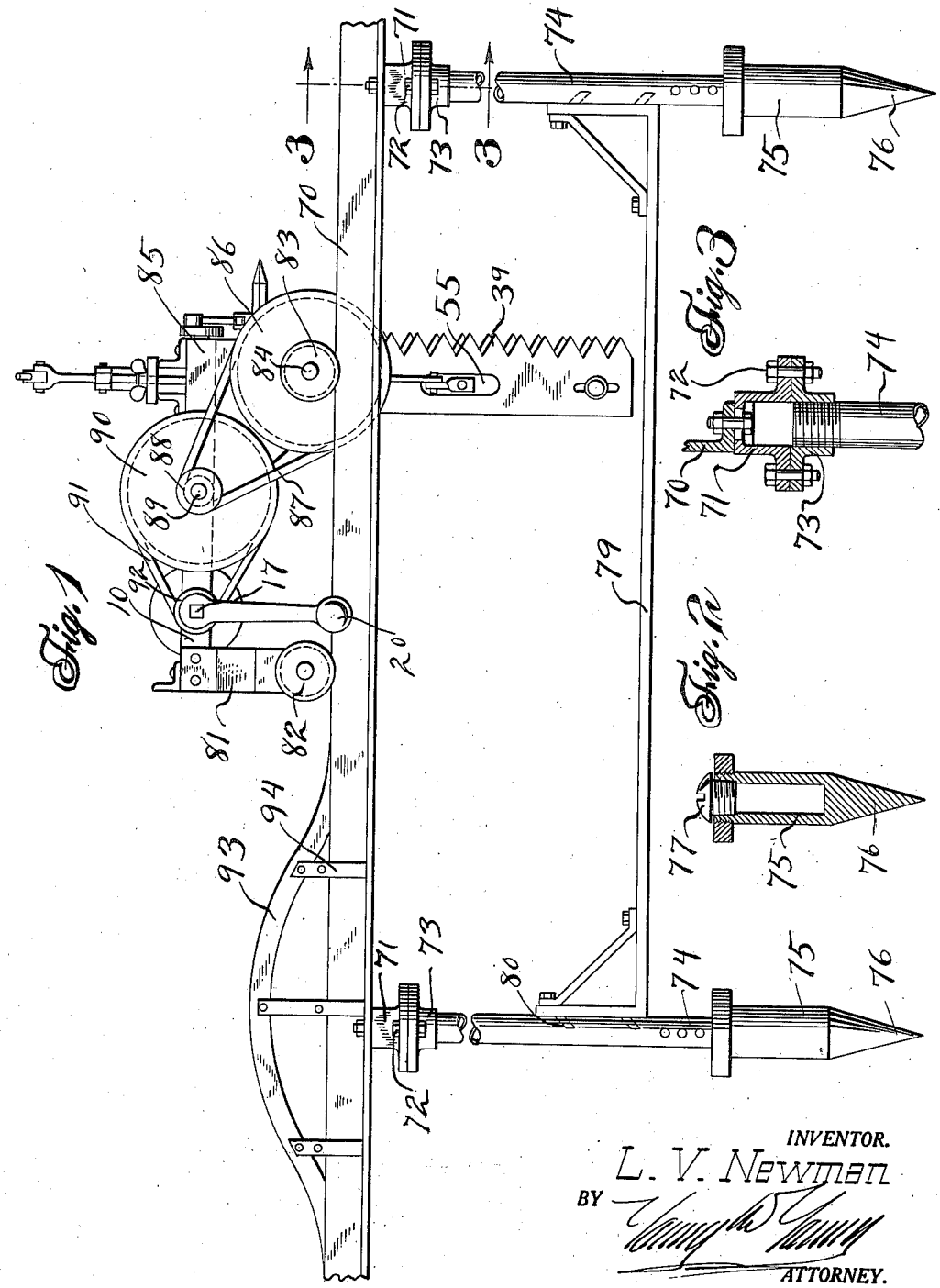

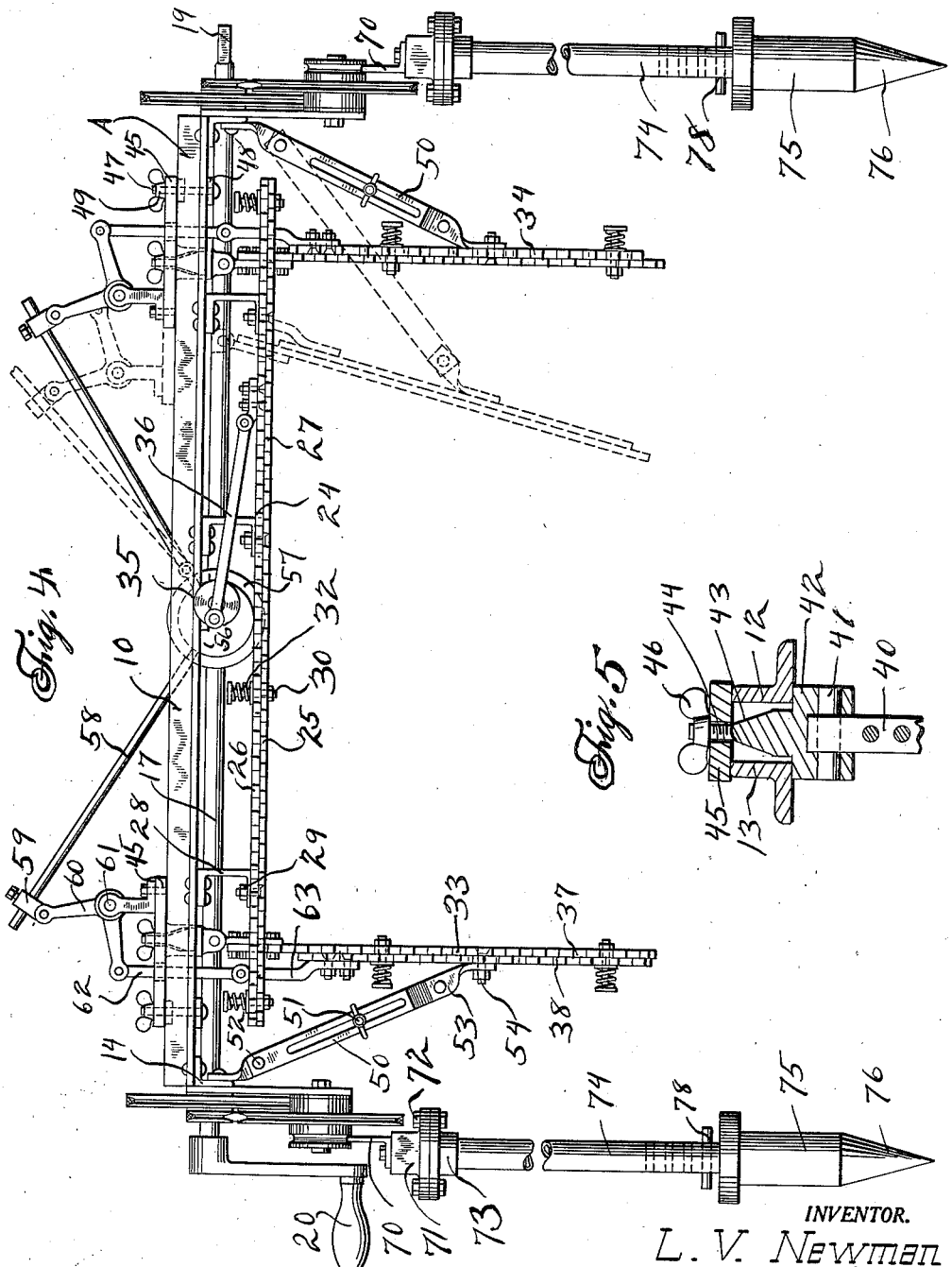

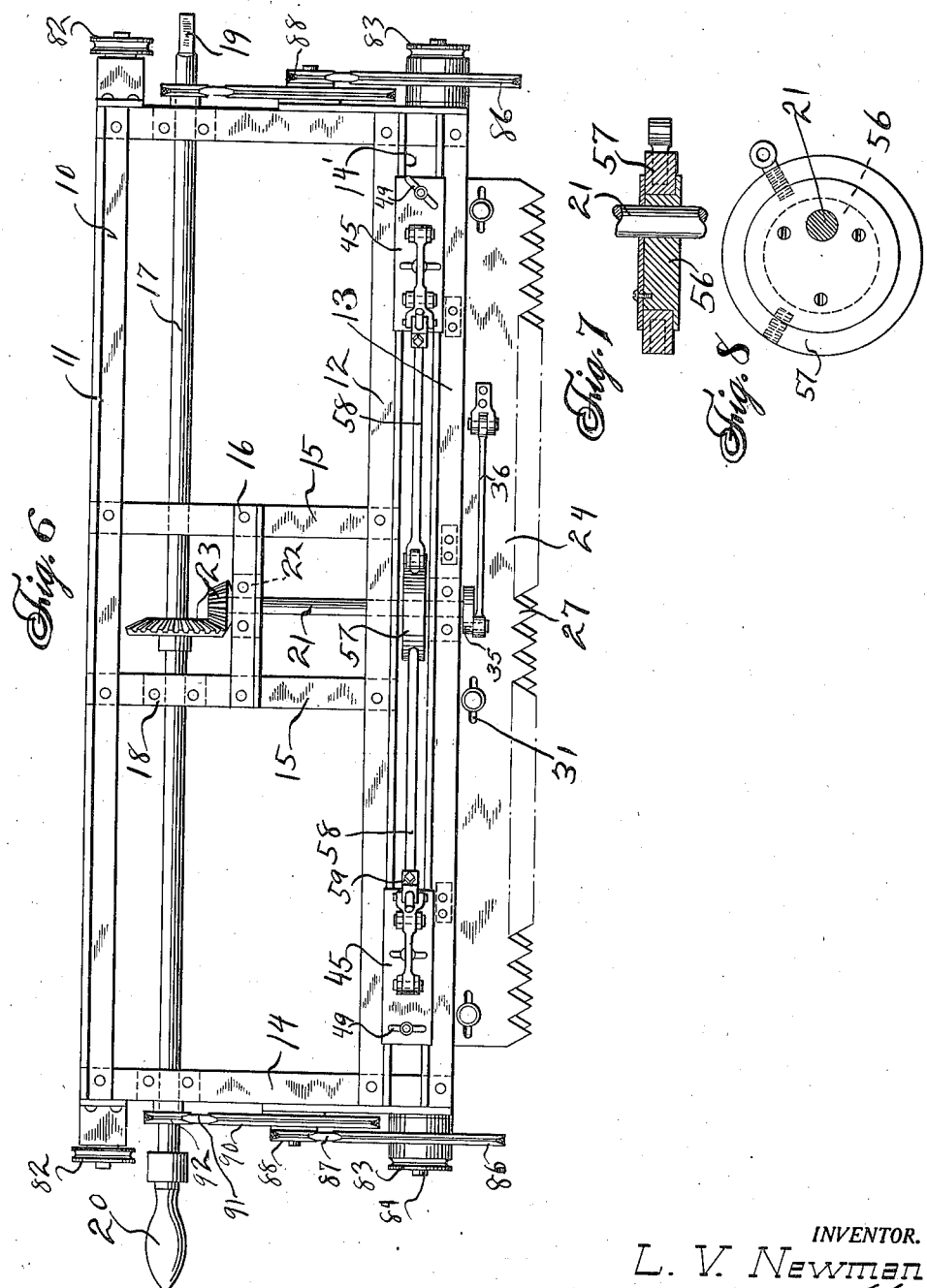

2,074,062

UNITED STATES PATENT OFFICE 2,074,062

HEDGE TRIMMER

Lloyd V. Newman, Racine, Wis.

Refiled for (abandoned) application Serial No. 686,026, August 21, 1933. This application April 8, 1936, Serial No. 73,390

2 Claims. (Cl. 56—237)

The present application is filed to take the place of applicant's abandoned application Serial No. 686,026, filed August 21, 1933.

This invention appertains to a novel device for trimming hedges, and has for one of its primary objects the provision of means whereby a hedge can be readily and expeditiously trimmed without the employment of a skilled gardener.

Considerable difficulty is experienced in the trimming of hedges, particularly where the hedge is of any great length. The services of a skilled gardener is required for the trimming operation, and even then difficulty is encountered in having the sides and top faces of the hedge uniform. Besides the skill required in trimming of the hedge, the same is a laborious and time consuming task.

It is, therefore, another prime object of my invention to provide a hedge trimming machine having novel means associated therewith for simultaneously trimming both the sides and top of a hedge, the machine being supported for movement on tracks arranged on opposite sides of the hedge, the tracks insuring the proper guiding of the machine during its travel for positively cutting the sides and top of the hedge evenly.

A further salient object of my invention is the provision of a drive shaft on the trimmer, which can be either actuated manually or by a prime mover for operating the top and side cutters, the shaft also operating the track wheels carried by the machine, so that the machine will be automatically advanced as the hedge is being trimmed.

A further important object of my invention is the provision of novel means for adjusting the side cutters relative to one another, so that the hedges of different widths can be readily trimmed.

A further object of my invention is the provision of means whereby the supporting tracks or rails can be raised or lowered, so that the machine can be supported at different heights for effectively operating on different sized hedges.

A further object of my invention is the provision of means detachably associated with the supporting track or rails, whereby the trimming machine can be moved up and down during its travel for making elevations in the hedge at different points, for the representation of columns, or the like, where a hedge of a fanciful type is desired.

A still further object of my invention is to provide a novel hedge trimming device of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawings, in which drawings:

Figure 1 is a side elevation of the improved hedge trimming machine, showing the same supported for movement on the trackway.

Figure 2 is a detailed vertical section through one of the supporting sockets for the track supporting posts.

Figure 3 is a detailed section taken on the line 3—3 of Figure 1, looking in the direction of the arrows, illustrating means for connecting the track or rails with the upper end of the supporting posts.

Figure 4 is a front elevation of my improved hedge trimming device.

Figure 5 is a detailed, transverse sectional view through the frame of the hedge trimmer, illustrating means for supporting one of the side cutters.

Figure 6 is a top plan view of the hedge trimmer, the track not being shown in this view.

Figure 7 is a detailed sectional view through the operating cam and cam strap for the side cutters.

Figure 8 is a front elevation of the operating cam and cam strap for the side cutters, the shaft for the cam being shown in section.

Referring to the drawings in detail, wherein similar reference characters designate corresponding parts throughout the several views, the letter A generally indicates my improved hedge trimming machine, which comprises a supporting frame 10. This frame 10 embodies a rear cross bar 11 and spaced parallel front cross bars 12 and 13.

These bars 11, 12, and 13 are all connected together by the side rails or bars 14. I preferably form the bars 11, 12, and 13 of angle iron, and it can be noted by referring to Figure 5 that the vertical flanges of the front bars 12 and 13 are disposed adjacent to one another to define a guideway 14', for a purpose which will be later set forth. The central portion of the frame 10 embodies spaced parallel straps 15, which are bolted or otherwise secured to the bars 11 and 12. The straps 15 can be connected together by a cross brace 16.

Extending across the frame 10 is the main operating shaft 17, which is mounted in suitable bearings 18 carried by the side rails or bars 14, and the straps 15. This shaft 17 can be driven in any preferred manner, either by hand or by the use of a prime mover. In the present illustration, I have shown the outer ends of the shaft 17 provided with polygonal extensions 19 for detachably receiving a hand crank 20. At the longitudinal center of the frame, a driven shaft 21 is provided, and this shaft is rotatably mounted in bearings 22 carried by the cross strap 16 and the front angle bar 13. Any desired means can be provided for operating the shaft 21 from the main shaft 17, such as by the use of bevel gearing 23. The shaft 21 is utilized for operating the top cutter or hedge trimmer 24, and for operating the side cutters or hedge trimmers 33 and 34.

The top hedge trimmer 24 extends out the front of the machine and substantially entirely across the same, and embodies a lower stationary cutter blade 25 and a top reciprocatory cutter blade 26. These blades 25 and 26 are provided with substantially V-shaped cutting teeth 27. Depending brackets 28 are rigidly secured to the front angle bar 13 of the frame and are bolted or otherwise secured, as at 29, to the rear face of the stationary cutter bar 25. The stationary cutter bar 25 and the reciprocatory cutter bar 26 are maintained in proper relation to one another by the use of bolts 30, which extend through slots 31 in the movable cutter blade 26, and through openings in the stationary cutter blade 25. Expansion springs 32 are placed about the bolts 30 and are confined between the movable cutter bar 26 and the heads of the bolts. This means holds the blades together at the desired tension. The forward end of the driven shaft 21 is provided with a crank wheel 35, and a pitman 36 is employed for connecting the crank wheel with the top cutter bar 26. Obviously, during rotation of the shaft 21, the top cutter bar will be reciprocated.

The side cutters 33 and 34 are of identical construction, and each includes an inner stationary cutter bar 37 and an outer reciprocatory cutter bar 38. The forward edges of the cutter bars 37 and 38 are provided with cutting teeth 39. The upper ends of the stationary cutter bars 37 have bolted or otherwise secured thereto hinge straps 40. These hinge straps 40 are connected by means of hinge pins 41 with supporting brackets 42, which engage the lower faces of the angle bars 12 and 13.

Extending between the angle bars 12 and 13 are bosses 43 formed on the upper ends of the brackets 42, and these bosses are provided with threaded extensions 44, which extend through the supporting plates 45. As clearly shown in Figure 4 of the drawings, the supporting plates 45 are disposed on opposite sides of the longitudinal center of the machine and are utilized for supporting certain operating mechanism for the side cutters, as will be later described.

Thumb nuts 46 are placed on the threaded extensions 44 for engaging the supporting plates 45, and these nuts serve as means for holding the plates 45 in an adjusted position, as well as the side cutters 33 and 34.

Additional bolts 47 can be employed for holding the plates 45 in adjusted position. As shown, these bolts 47 extend between the front bars 12 and 13 through the guideway 14', and holding plates 48 engage the lower faces of the front bars 12 and 13. A suitable thumb nut 49 is threaded on each of the bolts 47 in engagement with the plates 45.

By adjusting the plates 45 toward and away from one another, the side cutters 33 and 34 can be readily regulated to the width of the hedge being trimmed, and means is also provided for adjusting the angle of the blades 33 and 34, so that the hedge can be cut in different shapes, if desired. The hinge joint 41 allows the swinging movement of the side cutters 33 and 34, and the same can be held in their adjusted positions by means of adjustable straps 50. The straps 50 are provided with registering slots through which extend the holding bolts 51. The opposite ends of the straps are pivotally connected, as at 52, to the forward ends of the side bars 14 and to angle brackets 53, respectively.

The angle brackets 53 are in turn connected by means of bolts 54 with the stationary cutter blades 37 of the side cutters. The bolts 54 are rigidly carried by the stationary blades 37 and extend through slots 55 in the reciprocatory blades 38.

The means for reciprocating the movable blades 38 of the side cutters 33 and 34 consists of a cam wheel 56 keyed to the driven shaft 21. The cam wheel 56 is surrounded by a cam strap 57, which carries sockets for receiving the inner ends of the pitman rods 58. The outer ends of the pitman rods 58 are adjustably mounted in cuffs 59 carried by the upper arms of bell cranks 60. The bell cranks 60 are rockably mounted at their angles, as at 61, on suitable bearing brackets carried by the adjustable plates 45. The lower arms of the bell cranks 60 have pivotally connected thereto links 62, which are in turn pivotally connected to attachment arms 63 secured to the reciprocating blades 38 of the side cutters.

From the description so far, it can be seen that when the main operating shaft 17 is rotated, the driven shaft 21 will be actuated therewith, and this shaft will in turn actuate the front cutter through the medium of the crank and pitman 35 and 36, and the side cutters, through the medium of the bell cranks 60, rods 58, the cam 56 and cam strap 57.

One of the important features of my invention is the provision of novel means for supporting the machine relative to the hedge being trimmed, and this means comprises longitudinally extending side tracks or rails 70, which are disposed on opposite sides of the hedge.

These tracks or rails 70 can be in the nature of angle bars, and are bolted or otherwise secured to caps 71, which are in turn secured by means of bolts 72 to cuffs 73 carried by the upper ends of supporting posts or standards 74. The standards 74 are detachably and adjustably received within sockets 75. The lower ends of the sockets 75 are tapered, as at 76, to provide penetrating prongs, and these sockets are driven at spaced points into the ground on each side of the hedge.

It is preferred to leave the sockets permanently positioned in the ground, and when the posts 74 are removed therefrom, the upper ends of the sockets can be closed by means of removable plugs 77.

The posts can be raised or lowered in the sockets 75 in order to hold the tracks or rails 70 in different elevated adjusted positions, and the posts can be held in their preferred adjusted positions by means of cross pins 78, which can be inserted in selected openings in the posts for engagement with the upper faces of the sockets.

If desired, the posts 74 can be connected together by brace rails 79, and these rails 79 carry pins 80 for insertion in suitable socket openings in the posts. Similar brace rails can be placed through the hedge for connecting posts on opposite sides of the hedge together.

In order to mount the frame 10 of the machine on its supporting trackway for free movement, wheel brackets 81 are secured to the frame 10 adjacent to the rear ends thereof for supporting grooved rear wheels 82 for engaging the track.

Similar grooved front wheels 83 are provided for supporting the front of the frame, and these wheels 83 are keyed or otherwise secured to stub shafts 84 carried by front wheel brackets 85, secured to the frame 10. The stub shafts 84 also have keyed thereto relatively large pulley wheels 86. The pulley wheels 86 have trained thereabout, drive wheel belts 87, which are in turn trained over relatively small pulley wheels 88. The pulley wheels 88 are keyed or otherwise secured to stub shafts 89 rotatably carried by the sides of the frame. These stub shafts also have keyed thereto pulley wheels 90 of a larger size than the pulley wheels 88, and the pulley wheels 90 have trained thereabout belts 91. The belts 91 are trained over small drive pulley wheels 92, keyed or otherwise secured to the main operating shaft 17.

It, therefore, can be seen from the description that upon rotation of the drive shaft 17, not only the top and side cutters can be operated, but also the front track wheels 83 will be rotated for drawing the machine over the rails. Thus, the machine is automatically fed over the hedge during the reciprocation of the cutter bars.

Means can also be provided for making the different curvatures in the top of the hedge during the trimming thereof, if so desired, and this means may consist of arcuate track sections 93, which can be secured to the rails 79 by means of straps 94. When the machine strikes the curved track sections 93, the frame 10 will be elevated, consequently elevating the top cutter bar for bringing about the cutting of the hedge in a sinuous form.

From the foregoing description it can be seen that I have provided an exceptionally simple and novel means for trimming hedges, which will insure the uniform and proper trimming of the hedge, with a minimum amount of effort on the part of the operator of the machine.

Changes in details may be made without departing from the spirit or the scope of this invention, but what I claim as new is:

1. A device for trimming hedges comprising a wheeled supporting frame including a pair of spaced parallel front bars, a horizontally disposed top cutter carried by said bars, a pair of plates slidably mounted on the top face of the bars, means for adjustably holding the plates in a selected position on the top bars, depending brackets carried by the plates extending between the bars, and side cutter bars connected with said brackets, said connection embodying a hinge joint and adjustable braces connecting the side cutter bars intermediate their ends with the frame, whereby the angle of the side cutter bars can be changed.

2. A device for trimming hedges comprising a wheeled supporting frame, a horizontally disposed top cutter connected to the frame including a stationary cutter bar and a reciprocatory cutter bar, depending side cutters carried by the frame adjustable toward and away from each other and each including a stationary cutter bar and a reciprocatory cutter bar, a main operating shaft on the frame, a driven shaft operatively connected to the main shaft, a crank and pitman connecting the driven shaft with the reciprocatory cutter bar of the horizontally disposed cutter, a cam on said driven shaft, a cam strap surrounding the cam, bell cranks rockably mounted at their angles on the frame, means operatively connecting the inner arms of the bell cranks to the cam strap, and means operatively connecting the outer arms of the bell cranks to the reciprocatory blades of the side cutters, said means being adjustably connected with the outer arms of the bell cranks to agree with the adjustment of the side cutters.

LLOYD V. NEWMAN.